United States Patent
Walker et al.

(10) Patent No.: US 7,118,805 B2
(45) Date of Patent: Oct. 10, 2006

(54) HIGH TEMPERATURE OXIDATION INHIBITORS FOR CARBON-CARBON FRICTION MATERIALS

(75) Inventors: Terence B. Walker, South Bend, IN (US); Ilan Golecki, Parsippany, NJ (US); Laurie A. Booker, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/049,691

(22) Filed: Feb. 4, 2005

(65) Prior Publication Data

US 2005/0170182 A1   Aug. 4, 2005

Related U.S. Application Data

(62) Division of application No. 10/223,946, filed on Aug. 20, 2002, now Pat. No. 6,884,467.

(51) Int. Cl.
  *B32B 9/00*   (2006.01)
(52) U.S. Cl. ........................ 428/408; 428/704
(58) Field of Classification Search ................ 428/408; 427/313
  See application file for complete search history.

(56) References Cited

U.S. PATENT DOCUMENTS

| | | |
|---|---|---|
| 2,897,102 A | 7/1959 | Fisher |
| 3,421,913 A | 1/1969 | Falcettoni |
| 3,706,596 A | 12/1972 | Wallouch |
| 3,719,608 A | 3/1973 | Olstowski |
| 3,914,508 A | 10/1975 | Hooton et al. |
| 3,932,568 A | 1/1976 | Watts et al. |
| 3,936,574 A | 2/1976 | Marin |
| 4,019,912 A | 4/1977 | Augustin |
| 4,339,021 A | 7/1982 | Kosuda et al. |
| 4,457,967 A | 7/1984 | Chareire et al. |
| 4,795,677 A | 1/1989 | Gray |
| 4,837,073 A * | 6/1989 | McAllister et al. .......... 428/212 |
| 4,892,790 A * | 1/1990 | Gray .......................... 428/548 |
| 5,007,508 A | 4/1991 | Lacombe |
| 5,208,099 A | 5/1993 | Maiwald-Hiller et al. |
| 5,256,448 A | 10/1993 | De Castro |
| 5,286,565 A | 2/1994 | Holzl et al. |
| 5,298,311 A | 3/1994 | Bentson et al. |
| 5,368,938 A | 11/1994 | Holzl et al. |
| 5,398,784 A | 3/1995 | Haneda et al. |
| 5,439,080 A | 8/1995 | Haneda et al. |
| 5,518,816 A | 5/1996 | Shuford |

(Continued)

FOREIGN PATENT DOCUMENTS

WO   WO 00/51950   8/2000

(Continued)

*Primary Examiner*—Jennifer C. McNeil
*Assistant Examiner*—Daniel Miller
(74) *Attorney, Agent, or Firm*—Birch, Stewart, Kolasch & Birch, LLP

(57) ABSTRACT

Coated articles (19) that comprise components, made of carbon fiber or carbon-carbon composites which may be configured, for example, as aircraft landing system brake discs. The components (10) are coated with a system that includes a phosphorus-containing undercoating (11) having a specified formulation and a boron-containing overcoating (12) having specified characteristics. The coated articles of the invention, e.g., aircraft brake discs, are protected against catalytic oxidation when the article is subjected to temperatures of 800° C. (1472° F.) or greater. Also, a method of protecting a component made of a carbon fiber or carbon-carbon composite simultaneously against catalytic oxidation (e.g., catalyzed by de-icer compositions) and high temperature non-catalytic oxidation.

6 Claims, 1 Drawing Sheet

U.S. PATENT DOCUMENTS

| | | |
|---|---|---|
| 5,558,908 A | 9/1996 | Lukacs, III |
| 5,566,792 A | 10/1996 | Yamamoto et al. |
| 5,686,144 A | 11/1997 | Thebault et al. |
| 5,714,244 A | 2/1998 | Delaval et al. |
| 5,725,077 A | 3/1998 | Taylor et al. |
| 5,753,018 A | 5/1998 | Lamport et al. |
| 5,759,622 A | 6/1998 | Stover |
| 5,876,850 A | 3/1999 | Skowronski et al. |
| 5,962,135 A | 10/1999 | Walker et al. |
| 5,965,266 A | 10/1999 | Goujard et al. |
| 6,079,525 A | 6/2000 | Dietrich et al. |
| 6,110,268 A | 8/2000 | Gross et al. |
| 6,129,868 A | 10/2000 | Penkov et al. |
| 6,228,424 B1 | 5/2001 | De Nora et al. |
| 6,248,269 B1 | 6/2001 | Dietrich et al. |
| 6,302,246 B1 | 10/2001 | Näumann et al. |
| 6,455,159 B1 * | 9/2002 | Walker et al. ............... 428/408 |
| 6,726,753 B1 * | 4/2004 | Koucouthakis et al. .. 106/14.12 |
| 6,737,120 B1 * | 5/2004 | Golecki ......................... 427/8 |
| 6,740,408 B1 * | 5/2004 | Thebault et al. ............ 428/408 |

FOREIGN PATENT DOCUMENTS

WO    WO 01/60763 A2    8/2001

* cited by examiner

HIGH TEMPERATURE OXIDATION INHIBITORS FOR CARBON-CARBON FRICTION MATERIALS

CROSS-REFERENCE TO RELATED APPLICATION

This application is a division of application Ser. No. 10/223,946, filed Aug. 20, 2002, now U.S. Pat. No. 6,884,467 B2, entitled METHOD FOR SIMULTANEOUSLY PROTECTING CARBON-CONTAINING COMPONENTS AGAINST CATALYTIC OXIDATION AND HIGH TEMPERATURE NON-CATALYTIC OXIDATION. Priority in accordance with 35 U.S.C. §120 is claimed to application Ser. No. 10/223,946. The entire disclosure of application Ser. No. 10/223,946 is incorporated by reference into the present application.

FIELD OF THE INVENTION

This invention relates to a novel coating system for effecting a wide spectrum of oxidation resistance in carbon-carbon composites and other graphitic materials and to methods for the preparation of the oxidatively protected composites. This invention is particularly beneficial in the field of aircraft braking systems.

BACKGROUND OF THE INVENTION

Carbon fiber or C—C composites which are useful for instance in airplane braking systems are subject to oxidation and resultant weight loss (that is, loss of mass). Oxidative weight loss of such carbon composites is generally retarded by coating articles made of the carbon composites with an antioxidant coating.

U.S. patent application Ser. No. 09/518,013 (Golecki), filed 3 Mar. 2000, now U.S. Pat. No. 6,737,120 B1, relates to carbon fiber or C—C composites that are useful in a variety of applications. Golecki teaches methods of protecting such composites against oxidation by coating them with fluidized-glass type mixtures. The fluidized-glass mixtures are maintained as liquid precursors and are applied to components formed of carbon fiber or C—C composites. Once coated with the precursors, the coated C—C components are heat-treated or annealed for one or more cycles through a series of gradual heating and cooling steps. This creates glass coatings having thicknesses of about 1–10 mils. The thicknesses of the glass coatings may be varied by varying the composition of the fluidized glass precursor mixtures, the number of application cycles, and/or the annealing parameters.

The Golecki application teaches that the fluidized glass materials may comprise such materials as borate glasses (boron oxides), phosphate glasses (phosphorus oxides), silicate glasses (silicon oxides), and plumbate glasses (lead oxides). These glasses may include phosphates of manganese, nickel, vanadium, aluminum, and zinc, and/or alkaline and alkaline earth metals such as lithium, sodium, potassium, rubidium, magnesium, and calcium and their oxides, and elemental boron and/or boron compounds such as BN, $B_4C$, $B_2O_3$, and $H_3BO_3$. By way of example, Golecki discloses a boron-containing liquid fluidized glass precursor mixture that includes 29 weight-% phosphoric acid, 2 weight-% manganese phosphate, 3 weight-% potassium hydroxide, 1 weight-% boron nitride, 10 weight-% boron, and 55 weight-% water.

The composites coated with boron-containing fluidized-glass type mixtures of Golecki—that is, coated articles comprising components made of carbon fibers or carbon-carbon composites annealed at very high temperatures, each component being covered by a glass coating of approximately 1–10 mil—are protected against uncatalyzed oxidation when the article is subjected to temperatures of 800° C. (1472° F.) or greater, for instance at 1600° F. (871° C.). However, these composites do not show good resistance to some types of catalytic oxidation. In particular, for instance, such boron-containing glass-coated composites have been found to be subject to significant oxidative weight loss after exposure to airport runway de-icer (potassium acetate).

U.S. patent application Ser. No. 09/507,414 (Walker and Booker), filed 18 Feb. 2000, now U.S. Pat. No. 6,455,159 B1, likewise relates to carbon-carbon composites and graphitic materials. The Walker and Booker application has as objectives the protection of carbon/carbon composites or graphites at elevated temperatures up to and exceeding 850° C. (1562° F.) and the reduction of catalytic oxidation at normal operating temperatures.

Walker and Booker achieve these objectives by employing a penetrant salt solution which contains ions formed from 10–80 wt % $H_2O$, 20–70 wt % $H_3PO_4$, 0.1–25 wt % alkali metal mono-, di-, or tri-basic phosphate, and up to 2 wt % $B_2O_3$. Their penetrant salt solutions also include at least one of $MnHPO_4 \cdot 1.6H_2O$, $AlPO_4$, and $Zn_3(PO_4)_2$, in weight-percentages up to 25 wt %, 30 wt %, and 10 wt %, respectively.

While the Golecki coatings and the Walker and Booker coatings do provide significant antioxidant protection for carbon composites, there remains a need for antioxidant coating systems that provide a high level of oxidation protection simultaneously in both high temperature and catalyzed oxidation conditions.

SUMMARY OF THE INVENTION

The present invention provides coated articles that comprise components, made of carbon fiber or carbon-carbon composites which are annealed at temperatures in the range of 1600–2600° C. (2912–4712° F.). These articles may be configured, for example, as aircraft landing system brake discs.

In accordance with this invention, the component is covered by an undercoating comprising ions formed from 10–80 wt % $H_2O$, 20–70 wt % $H_3PO_4$, 0.1–25 wt % alkali metal mono-, di-, or tri-basic phosphate, 0–2 wt % $B_2O_3$, and 0–25 wt % $MnHPO_4 \cdot 1.6H_2O$, 0–30 wt % $AlPO_4$, and 0–10 wt % $Zn_3(PO_4)_2$, provided that at least one of $AlPO_4$, $MnHPO_4 \cdot 1.6H_2O$, and $Zn_3(PO_4)_2$ is present. The undercoating preferably comprises ions formed from 20–50 wt % $H_2O$, 30–55 wt % $H_3PO_4$, 0–15 wt % $MnHPO_4 \cdot 1.6H_2O$, 2–15 wt % $AlPO_4$, 0.5–2 wt % $B_2O_3$, 1–7 wt % $Zn_3(PO_4)_2$, and 10–20 wt % $KH_2PO_4$. This undercoating generally has a thickness of approximately 1–10 mil, and is annealed to the carbon composite at a temperature in the range of 250–900° C. (482–1652° F.).

In further accordance with the present invention, this phosphorus-containing undercoating is covered by a boron-containing glass overcoating of approximately 1–10 mil in thickness, which is annealed to the undercoating at a temperature in the range of 250–650° C. (482–1202° F.). The formulation used to make the boron-containing glass overcoating also preferably contains phosphoric acid. It is particularly preferred that the boron-containing glass overcoating contains boron nitride and also contains boron carbide and/or elemental boron.

The resultant coated article, e.g., an aircraft brake disc, is protected against catalytic oxidation, even when the article is subjected to temperatures of 800° C. (1472° F.) or higher.

The present invention also contemplates a method of protecting a component made of carbon fiber or carbon-carbon composite simultaneously against catalytic oxidation (e.g., catalyzed by $CH_3COOK$) and high temperature non-catalytic oxidation, which method comprises the steps of covering said composite with an undercoating comprising ions formed from 10–80 wt % $H_2O$, 20–70 wt % $H_3PO_4$, 0.1–25 wt % alkali metal mono-, di-, or tri-basic phosphate, 0–2 wt % $B_2O_3$, and 0–25 wt % $MnHPO_4 \cdot 1.6H_2O$, 0–30 wt % $AlPO_4$, and 0–10 wt % $Zn_3(PO_4)_2$, provided that at least one of $AlPO_4$, $MnHPO_4 \cdot 1.6H_2O$, and $Zn_3(PO_4)_2$ is present, said undercoating having a thickness of approximately 1–10 mil, and subsequently covering the undercoating with a boron-containing glass overcoating having a thickness of approximately 1–10 mil.

DETAILED DESCRIPTION OF THE INVENTION

Figure 1:
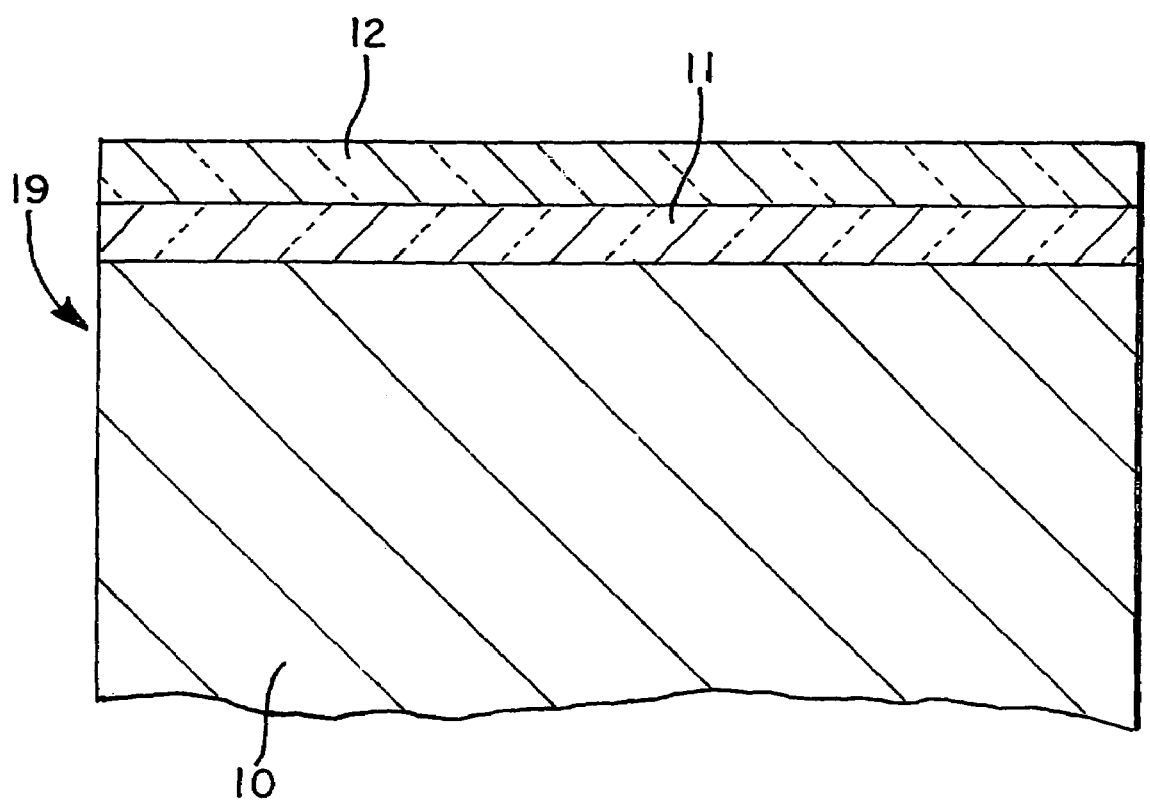
FIG. 1 is a schematic view of a carbon fiber or C—C substrate having a coating system formed in accordance with the present invention.

The present invention is embodied by a carbon fiber or C—C composite component that is coated with a two-layer anti-oxidant system. For a better understanding of this invention, attention is directed to FIG. 1, wherein a coated carbon fiber or C—C article component is generally illustrated at 19. A component 10 is covered by a protective undercoating 11 (phosphorus-containing glass) and the undercoating 11 is covered by a protective overcoating 12 (boron-containing glass).

Component 10

Before the first fluidized glass formulation is applied to the C—C composite component, the component may be fabricated into almost any desired shape. The present invention is particular valuable with the C—C composite component is an aircraft landing system brake disc.

Carbon-carbon composites are generally prepared from carbon preforms. Carbon preforms are made of carbon fibers, formed for instance of pre-oxidized polyacrylonitrile (PAN) resins. These fibers can be layered together to form shapes, such as friction brake discs, which shapes are then heated and infiltrated with methane or another pyrolyzable carbon source to form the C—C composite preforms. Carbon-carbon composites useful in accordance with the present invention typically have densities in the range of from about 1.6 g/cm³ through 1.9 g/cm³. Methods of manufacturing C—C composites are generally well known to those skilled in the art. A good reference in this area is: Buckley et al., *Carbon-Carbon Materials and Composites*, Noyes Publications, 1993. The entire contents of this publication are hereby expressly incorporated by reference.

For purposes of illustration only, the C—C composite component 10 may be fabricated from woven fabric panes of pitch-based Amoco P30X carbon fiber tows in a harness satin weave or from a pitch-based Nippon XNC25 in a plain weave. The tows are rigidized with a few weight-% carbon-containing resin, such as epoxy Novolac. The material is then carbonized at a temperature in the range of 800–1000° C. (1472–1832° F.) and densified by carbon CVD. The resulting materials is then annealed in an inert gas at a temperature in the range of 1600–2600° C. (2912–4712° F.). This process creates a C—C composite component that is adaptable for use in high temperature environments when it is properly protected against oxidation. It is understood that the oxidation protective coating system of the present invention is applicable to C—C composite components regardless of how the C—C composite components are fabricated.

Undercoating 11

The C—C component 10 is immersed or dipped in a liquid bath precursor of fluidized glass for several minutes. Preferred precursors for use in applying the undercoating layer in accordance with the present invention are phosphoric acid-based penetrant salt solutions, which are described in detail in U.S. patent application Ser. No. 09/507,414, filed 18 Feb. 2000, the entire disclosure of which is hereby expressly incorporated by reference. A typical penetrant salt solution that can be used to form the undercoating herein contains ions formed from 10–80 wt % $H_2O$, 20–70 wt % $H_3PO_4$, 0.1–25 wt % alkali metal mono-, di-, or tri-basic phosphate, and optionally up to 2 wt % $B_2O_3$. The typical penetrant salt solution will also include at least one of $MnHPO_4 \cdot 1.6H_2O$, $AlPO_4$, and $Zn_3(PO_4)_2$, in weight-percentages up to 25 wt %, 30 wt %, and 10 wt %, respectively.

In accordance with this invention, the surface of the carbon-carbon composite or graphitic material is treated with the penetrant solution by painting, dipping, or other conventional application techniques. Subsequently the surface-treated material is cured at a temperature in the range of 250–900° C. (482–1652° F.). Typically, the surface is treated with one to three coats of the penetrant solution, and the curing step is generally accomplished in one to six hours.

The fluidized glass liquid precursor as described above is maintained at a temperature in the range of approximately 20–90° C. (68–194° F.). Component 10 may be rotated relative to the liquid precursor to improve the wetting characteristics and uniformity of the coating. After the immersion step is complete, the glass-coated component 10 is removed and annealed or heat-treated in a non-oxidizing environment. The annealing step may be carried out with a relatively slow ramp-up and possible slow ramp-down of the heating and cooling rates, respectively. For instance, the ramp-up rate may be on the order of 1–2° C. (1.8–3.6° F.) per minute. The temperature time cycle of the annealing process may vary. For instance, the heat treatment may include a gradual ramp up in temperature to about 250–350° C. (482–662° F.) at the aforesaid rate, which may then be followed by a soak wherein the temperature is maintained in the range of 250–350° C. (482–662° F.) for approximately 1–10 hours. Upon completion of this extended heating step the temperature may be further increased, at the aforesaid rate, until reaching a range of 550–650° C. (1022–1202° F.), at which point the temperature is maintained in that range for approximately 1–10 hours. After completion of this second prolonged heat treatment, the component may be gradually cooled at a ramp-down rate on the order of 1–2° C. (1.8–3.6° F.) per minute until reaching ambient temperature.

These annealing procedures may make use of a flowing inert gas, such as nitrogen or argon. Alternatively, component 10 may be located in a vacuum changer. In either case, upon completion of these annealing steps, the fluidized phosphorus-containing glass coating is converted to a solid glass coating 11 completely enveloping C—C component 10.

Overcoating 12

The composite component 10 bearing the undercoating 11 is immersed or bathed in a fluidized boron-containing glass precursor. The overcoating 12 may comprise ions formed from 20–60 wt % $H_2O$, 25–50 wt % $H_3PO_4$, 2–20 wt % alkali metal hydroxide, 1–10 wt % alkali or alkaline earth metal mono-, di-, or tri-basic phosphate, 1–10 wt % boron nitride, and one or both of 1–10 wt % elemental boron and/or 1–10 wt % boron carbide. These components and their relative amounts are illustrative and not limiting. A more complete disclosure of boron-containing glass precursors useful as the overcoating in accordance with the present invention may be found in U.S. patent application Ser. No. 09/518,013, filed 3 Mar. 2000, the entire disclosure of which is hereby expressly incorporated by reference.

The following Table shows various typical embodiments of specific overcoating formulations that can be used in accordance with the present invention (with weights given in grams).

|  | B4 | B5 | B6 | B7 |
|---|---|---|---|---|
| Phosphoric acid | 188.6 | 188.6 | 188.6 | 188.6 |
| Potassium hydroxide | 18 | 18 | 18 | 18 |
| Manganese phosphate | 14.1 | 14.1 | 14.1 | 14.1 |
| BN (boron nitride) | 9.2 | 9.2 | 9.2 | 9.2 |
| B (boron, elemental) | 67.3 | 101 | 33.6 | 0 |
| $B_4C$ (boron carbide) | 0 | 0 | 43.0 | 86.0 |
| Water | 200 | 200 | 200 | 200 |

Such overcoating formulations for use in this invention can be prepared, for instance, by: premixing the phosphoric acid with 128 grams of water, premixing the potassium hydroxide with 72 grams of water, combining these two aqueous mixtures, adding the manganese phosphate, and finally adding the boron and/or boron compounds.

The C—C component 10 is immersed or dipped in a liquid bath precursor of fluidized boron-containing glass for several minutes. The liquid precursor is maintained at a temperature in the range of approximately 20–90° C. (68–194° F.). The component 10 may be rotated relative to the liquid precursor to improve the wetting characteristics and uniformity of the coating. After the immersion step is complete, the glass-coated component 10 is removed and annealed or heat-treated in a non-oxidizing environment. The annealing step may be carried out with a relatively slow ramp-up and possible slow ramp-down of the heating and cooling rates, respectively. For instance, the ramp-up rate may be on the order of 1–2° C.(1.8–3.6° F.) per minute. The temperature time cycle of the annealing process may vary. For instance, the heat treatment may include a gradual ramp up in temperature to about 250–350° C. (482–662° F.) at the aforesaid rate, which may then be followed by a soak wherein the temperature is maintained in the range of 250–350° C. (482–662° F.) for approximately 1–10 hours. Upon completion of this extended heating step the temperature may be further increased, at the aforesaid rate, until reaching a range of 550–650° C. (1022–1202° F.), at which point the temperature is maintained in that range for approximately 1–10 hours. After completion of this second prolonged heat treatment, the component may be gradually cooled at a ramp-down rate on the order of 1–2° C.(1.8–3.6° F.) per minute until reaching ambient temperature.

These annealing procedures may make use of a flowing inert gas, such as nitrogen or argon. Alternatively, component 10 may be located in a vacuum changer. In either case, upon completion of these annealing steps, the fluidized boron-containing glass coating is converted to a solid glass coating 12 completely enveloping and forming—with solid glass coating 11—a protective barrier against undesirable catalytic and non-catalytic oxidation of C—C component 10. In other words, at this stage, the composite component 10 is permanently enveloped within a fluidized glass protective coating system (11, 12). The coating system (11, 12) comprises glass materials that are capable of at least some flowing with at least partial sealing of any pre-existing cracks that may be present in the C—C component.

Variability

The properties of the glass materials 11 and 12 may be tailored to the temperature range over which and/or oxidation catalysts to which coating system (11, 12) is designed to protect the composite component 10 from destructive oxidation. Likewise, the thicknesses of and numbers of glass coatings applied to component 10 will depend on the method of applying the coating and the intended use for the coated article 19. If the coated article will be subjected to sustained or repeated very high temperatures, a number of separate sub-layers may be applied to make up undercoating 11 and/or overcoating 12. This antioxidant coating system may be used on a wide variety of carbon fiber or carbon-carbon composite articles, including but not limited to aircraft landing system brake discs.

Properties

The following Table elucidates unexpected properties shown by the presently claimed coated articles. In the Table, (C—C)P-13K was a composite with a phosphorus-containing coating, (C—C)B5 was a composite with a boron-containing coating, (C—C)B5/P-13K was a composite having a boron-containing undercoating and a phosphorus-containing overcoating, and (C—C)P-13K/B5 was a composite having a phosphorus-containing undercoating and a boron-containing overcoating.

To determine weight loss on oxidation, coated C—C specimens were weighed and their dimensions were measured prior to being subjected to a flowing stream of dry air in an alumina tube while heated in a furnace having a uniform hot zone sufficiently large to encompass the components. The dry flowing air was maintained at temperatures of 871° C. (1600° F.) to test for uncatalyzed oxidation and 649° C. (1200° F.) to test for catalyzed oxidation. The results are reported in the Table.

|  | Uncatalyzed Oxidation[1] | De-Icer Catalyzed Oxidation[2] (potassium acetate) |
|---|---|---|
| (C—C)P-13K | 14.5% weight loss | 0.6% weight loss |
| (C—C)B5 | 1% weight gain | 82% weight loss |
| (C—C)B5/P-13K |  | 49.5% weight loss |
| (C—C)P-13K/B5 |  | 0.3% weight loss |

[1] oxidation for 5 hours at 871° C. (160 0° F.)
[2] oxidation for 24 hours at 649° C. (12 00° F.)

As can be seen from the results present in the above Table, the P-13K coating provides good protection against catalyzed oxidative weight loss but not against uncatalyzed oxidative weight loss and the B5 coating provides good protection against uncatalyzed oxidative weight loss but not against catalyzed oxidative weight loss. Also, a composite having a boron-containing undercoating and a P-13K overcoating is not protected against catalyzed oxidative weight loss. Surprisingly, however, a composite having a P-13K undercoating and a boron-containing overcoating is well protected against oxidative weight loss.

What is claimed is:

1. A coated article comprising a component made of carbon fiber or carbon-carbon composite annealed at a temperature in the range of 1600–2600° C. (2912–4712° F.), said component being covered by a phosphorus-containing undercoating comprising ions formed from 10–80 wt % $H_2O$, 20–70 wt % $H_3PO_4$, 0.1–25 wt % alkali metal mono-, di-, or tri-basic phosphate, 0–2 wt % $B_2O_3$, and 0–25 wt % $MnHPO_4.1.6H_2O$, 0–30 wt % $AlPO_4$, and 0–10 wt % $Zn_3(PO_4)_2$, provided that at least one of $AlPO_4$, $MnHPO_4.1.6H_2O$, and $Zn_3(PO_4)_2$ is present, said undercoating having a thickness of approximately 1–10 mil, said undercoating being covered by a boron-containing glass overcoating comprising boron nitride and also at least one of boron carbide and elemental boron, said undercoating having a thickness of approximately 1–10 mil, wherein said coated article is protected against catalytic oxidation when the article is subjected to temperatures of 800° C. (1472° F.) or greater.

2. The coated article of claim 1, configured as an aircraft landing system brake disc.

3. The coated article of claim 1, wherein the phosphorus-containing undercoating comprises ions formed from 20–50 wt % $H_2O$, 30–55 wt % $H_3PO_4$, 0–15 wt % $MnHPO_4.1.6H_2O$, 2–15 wt % $AlPO_4$, 0.5–2 wt % $B_2O_3$, 1–7 wt % $Zn_3(PO_4)_2$, and 10–20 wt % $KH_2PO_4$.

4. The coated article of claim 1, wherein the formulation used to make the boron-containing glass overcoating comprises ions formed from 20–60 wt % $H_2O$, 25–50 wt % $H_3PO_4$, 2–20 wt % alkali metal hydroxide, 1–10 wt % alkali or alkaline earth metal mono-, di-, or tri-basic phosphate, 1–10 wt % boron nitride, and one or both of 1–10 wt % elemental boron and/or 1–10 wt % boron carbide.

5. The article of claim 1, wherein the undercoating is annealed to the carbon composite at a temperature in the range of 250–900° C. (482–1652° F.).

6. The article of claim 1, wherein the glass overcoating is annealed to the undercoating at a temperature in the range of 250–650° C. (482–1202° F.).

* * * * *